Oct. 1, 1935.  C. A. BEYTHAN  2,016,263
SELF CLEANING RAKE
Filed June 1, 1934
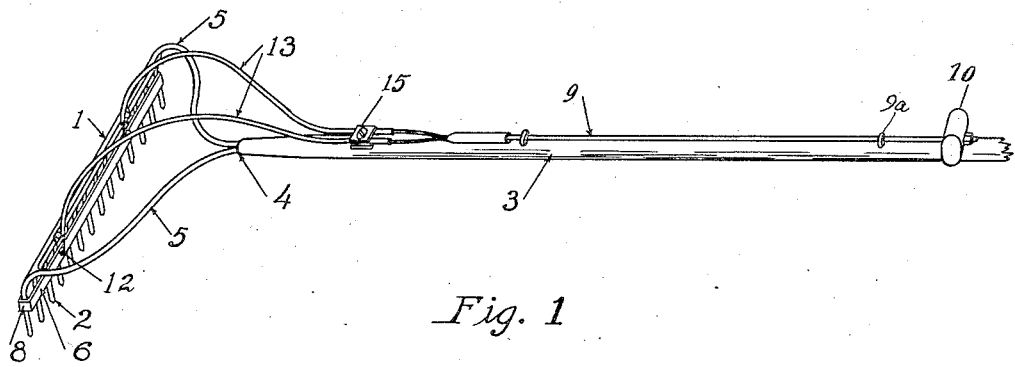
Fig. 1
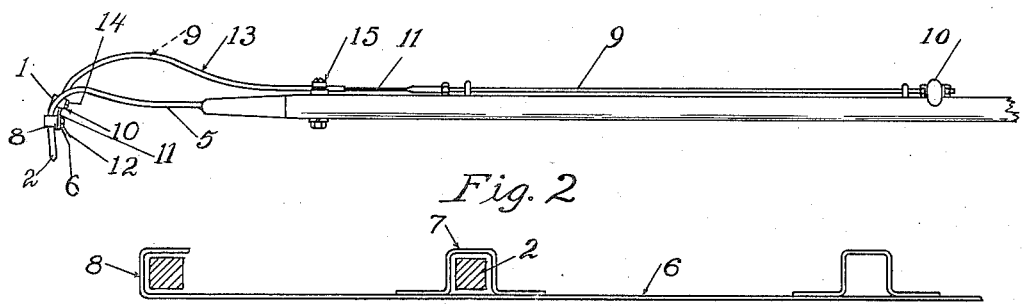
Fig. 2
Fig. 3
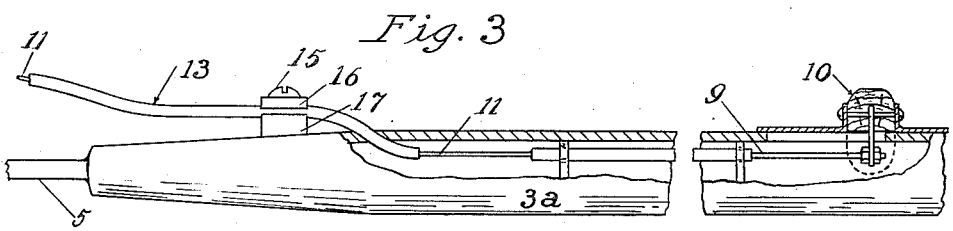
Fig. 4
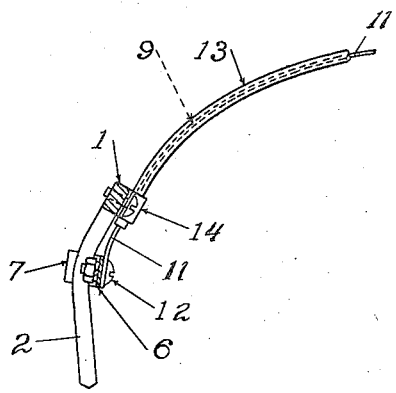
Fig. 5
Inventor
CARL A. BEYTHAN
By George B. Willcox
Attorney Patented Oct. 1, 1935

2,016,263

UNITED STATES PATENT OFFICE 2,016,263

SELF-CLEANING RAKE

Carl A. Beythan, Saginaw, Mich., assignor of one-third to George B. Willcox, Saginaw, Mich.

Application June 1, 1934, Serial No. 728,523

2 Claims. (Cl. 55—146)

This invention relates to self-cleaning rakes of the kind in which the tines extend downwardly at right angles to the handle, and its objects are to provide a novel and improved cleaning bar actuating device constructed and arranged so as to shove the bar downwardly to the ends of the tines for cleaning the rake and to draw it up to the rake head without employing any return spring or the like, both movements of the bar being accomplished in so positive and direct a manner that the bar will be prevented from becoming disaligned or askew on the row of tines and will not catch or lock; to provide guidance for the flexible wires that actuate the cleaning bar and to constrain them from springing or buckling when pushing the bar down to clean the rake; to provide for readily placing the bar at any desired height on the tines and to hold it there while the rake is in use, the holding of the bar in such adjusted positions being accomplished without employing any clamps or additional fasteners; to provide a rake-tooth cleaner of the character described that shall be simple and inexpensive in construction, light in weight and adapted for use on rakes of various sizes and designs; and to provide means for installing the cleaning device on a rake so it can be sold separately from the rake and can be put in place by the user.

With the foregoing and certain other objects in view, which will appear later in the specifications, the invention comprises the devices described and claimed and the equivalents thereof.

I will now describe the construction and mode of operation of my invention in its preferred form, it being understood, however, that the specific illustrations and descriptions are for the purpose of explaining my claimed invention and are not to be construed in a limiting sense, except in so far as such limitation to the form described is necessary to distinguish them from the prior art.

In the drawing, Fig. 1 is a view in perspective of a rake, partly broken away, embodying my invention.

Fig. 2 is a side view of the parts shown in Fig. 1.

Fig. 3 is a fragmentary top plan view of an end part of the cleaner bar.

Fig. 4 is a detail view of a tubular rake handle showing the manner of applying my invention thereto, the view being part sectional.

Fig. 5 is a fragmentary view showing a means for attaching the flexible wire to the cleaning bar and the means for securing the tubular guide to the rake head.

A conventional rake to which my invention is adapted to be applied consists of a head 1 with tines 2, a handle 3 having at its end a ferrule or socket 4, braces 5, 5 that connect the head 1 and handle 3, and a vertically movable cleaner bar 6 that operates up and down the tines, being mounted preferably on the side of the row facing the user. Loops 7 are spaced along bar 6, each loop embracing one of the tines 2, and the ends of the bars are bent around the outermost tines, as shown at 8. A push-pull rod 9 has limited movement lengthwise along the rake handle 3 and is fitted with a suitable hand-grip 10.

My improved device for actuating the cleaning bar 6 comprises flexible, preferably resilient, wires 11, 11 secured to the bar by fasteners such as rivets or screws 12. The wires 11 are bowed so as to extend upwardly and rearwardly to a place on the handle 3 intermediate its ends, where they are joined together and secured to the push-pull rod 9. The rod 9 is guided through eyelets or suitable bearings 9a, as shown in Fig. 1, or if desired the rod may be concealed within a hollow tubular rake handle 3a, as indicated in Fig. 4. The flexible wires 11, 11 may be resilient piano wires, or they may be made of iron, brass or other suitable material.

Each wire is guided and constrained. It may, for example, be enclosed in a tubular sheath 13 which is fixed at one end to the rake head 1 by a clip 14, the other end being joined to the handle 3 by a fastener 15 that carries washers 16, 17 between which the sheaths 13 are clamped. The sheaths curve upwardly from the rake head and rearwardly to the handle so as to conform approximately to the curves which the bowed wires 11 would normally assume. They terminate nearer the end of said handle than the point of attachment of wire 11 and push rod 9. The sheaths 13 may be of aluminum, brass, iron or other suitable material and need be only slightly larger than the wires. They serve as guideways or channels to direct the flexible wires and by keeping the wires from springing or buckling while the cleaner is being pushed down or pulled up they enable the wires, although small, to carry any amount of end thrust or pull that is likely to be exerted by the operator upon grip 10 when working the cleaner bar 6.

After the rake has been used in thick leaves and a mass of material has been impaled on the tines or wedged between them more or less compactly, the user thrusts member 10 away from him with the palm of his hand and so strips the obstruction from the tines.

In use, the advantages of the device herein described are ease and positiveness in cleaning the rake; there is no likelihood of causing the cleaner bar to become askew or bind on the tines because the wires 11, 11 always move equal distances and exert equal thrust upon bar 6 at their points of attachment, 12, 12.

Even an object like a potato if impaled on the tines near an extremity of the rake head can be dislodged by the cleaning bar 6 without disarranging the bar on the tines.

The arrangement is such that nearly the full length of the tines is available for raking when the cleaning bar 6 is at the top. The rake is adapted for use like a smoother or scraper when the bar is pushed down to the ends of the tines. For example, it can drag a pile of leaves or other material across a sidewalk, leaving the surface of the walk comparatively clean.

When the bar is set so as to expose only a short length of the tines, the rake can be used for leveling or smoothing off the top soil of a garden where only a slight depth of soil is to be disturbed, as indicated in Fig. 5. This latter adjustment is also advantageous for raking lawns in the early spring when the soil is soft and the tender young shoots are beginning to appear through a light mat of dried grass left from the last year's growth. Under such circumstances, the bar 6 being set in the position just described, the tine tips will rake out the dried grass and the bar will drag it away. Moreover, the cleaning bar acts as a depth gauge, preventing the tines from digging up the new shoots. When the bar is set as just described small objects such as acorns and their caps that are partly embedded in the soil can be raked loose and hauled away by the cleaning bar, rendering it unnecessary to first rake and afterwards sweep, as has heretofore beeng the practice.

Having thus described my invention, what I claim and desire to secure by Letters Patent is:

1. In a rake having a tined head and a handle substantially at right angles thereto and a cleaner bar movable up and down along the tines and having a push-pull rod mounted for limited endwise movement along the rake handle and a handgrip member on said rod, operative means connecting said cleaner and said rod comprising a pair of flexible wires, an end of each wire being secured to said bar and bowed to extend upwardly and rearwardly therefrom, its other end being fixed to the push-pull rod, a pair of curved tubular sheaths each enclosing one of said wires, each sheath being fixed at one end to the rake head, its other end being fixed to the rake handle and terminating nearer the end of the handle than the point of attachment of said wires to said push-pull rod, said wire having frictional engagement with the sheath sufficient to keep the cleaner bar at any desired adjusted height above the tips of the tines during the operation of the rake.

2. In a rake having a tined head and a handle perpendicular thereto, and a cleaner bar movable up and down along the tines, and having a push-pull rod mounted for limited endwise movement along the rake handle, the combination of a pair of flexible wires each having an end secured to said bar and extending upwardly and bowed rearwardly therefrom, the other end of said wire being fixed to the push-pull rod, a tubular sheath enclosing each wire, an end of said sheath being fixed to the rake head, above the cleaner bar, its other end being bent upwardly, rearwardly and downwardly and fixed to the rake handle at a point adjacent the end thereof.

CARL A. BEYTHAN.